United States Patent [19]

Beasley

[11] Patent Number: 5,157,539

[45] Date of Patent: Oct. 20, 1992

[54] MULTI-ELEMENT ELECTROOPTIC MODULATORS WITH CRYSTAL AXES ORIENTED OBLIQUELY TO DIRECTION OF ELECTRIC FIELD

[75] Inventor: J. Donald Beasley, Lyndhurst, Ohio

[73] Assignee: Cleveland Crystals, Inc, Highland Heights, Ohio

[21] Appl. No.: 643,380

[22] Filed: Jan. 22, 1991

[51] Int. Cl.$^5$ .............................................. G02F 1/03
[52] U.S. Cl. .................................. 359/251; 359/259
[58] Field of Search .............. 359/250, 251, 254, 255, 359/256, 257, 259, 321

[56] References Cited

U.S. PATENT DOCUMENTS

| | | | |
|---|---|---|---|
| 3,402,002 | 9/1968 | Eden | 350/388 |
| 3,429,636 | 2/1969 | Wentz | 359/259 |
| 3,564,450 | 2/1971 | Immarco et al. | 359/257 X |
| 3,625,592 | 12/1971 | Beasley | 359/251 |
| 3,630,597 | 12/1971 | Hulme | 359/250 |

*Primary Examiner*—Frank Gonzalez
*Attorney, Agent, or Firm*—James A. Hudak

[57] ABSTRACT

The concept of using only a component of an applied electric field to control the electrooptic response in each element of a multi-crystal electrooptic modulator comprising a matched grouping of birefringent electrooptic elements is disclosed. The foregoing concept permits the orientation of the polarization eigenvectors of the grouped elements to compensate for the effects of the static birefringence of the material comprising the elements while retaining the use of parallel applied electric fields and eliminating the need for an interposed optical rotator or waveplate.

19 Claims, 1 Drawing Sheet

MULTI-ELEMENT ELECTROOPTIC MODULATORS WITH CRYSTAL AXES ORIENTED OBLIQUELY TO DIRECTION OF ELECTRIC FIELD

TECHNICAL FIELD

The present invention relates generally to electrically controlled optical modulators and, more particularly, to optical modulators that utilize pluralities of crystal elements connected to parallel pairs of electrodes and do not require the use of optical rotators or halfwave plates between the crystal elements

BACKGROUND ART

The use of birefringent electrooptic crystal materials in the construction of electrically controlled optical modulators is well known. Various configurations of electrooptic modulators using the $r_{63}$ electrooptic coefficient in crystal materials of crystallographic point group $\bar{4}2$ m ($KH_2PO_4$ and its isomorphs, for example) are described in U.S. Pat. No. 3,429,636 (Wentz) and in U.S. Pat. No. 3,402,002 (Eden). Eden describes electrooptic modulators operated by electric fields applied parallel to the direction of light passage through the devices (known as longitudinal-mode) and electrooptic modulators operated by electric fields applied perpendicular to the direction of light passage through the devices (known as transverse-mode). Other forms of transverse-mode electrooptic modulators which depend upon the $r_{41}$ electrooptic coefficient of crystals of point group $\bar{4}2$ m have been described by M. Dore in an article entitled "A Low Drive-Power Light Modulator Using a Readily Available Material ADP", IEEE Journal of Quantum Electronics, Volume QU-3, No. 11, November 1967 and R. D. Compton in an article entitled "The Promising World of Electro-Optical Modulators", Electro-Optical Systems Design, Volume 1, No. 2, September, 1969.

Of particular interest are the paired-crystal electrooptic modulator configurations disclosed in U. S. Pat. No 3,402,002 for using the $r_{63}$ electrooptic coefficient in crystal materials of point group $\bar{4}2$ m in the transverse mode, since these configurations permit the adjustment of design parameters to allow the use of lower operating voltages than are required for the operation of single element, longitudinal-mode devices. One embodiment (FIG. 3) of the invention disclosed in the foregoing patent requires each of the elements in a crystal pair to have an electric field applied in a direction that is perpendicular to the direction in which the electric field is applied to the other element of the crystal pair. This is a somewhat inconvenient arrangement that makes it impossible to contain both crystal elements between a parallel pair of electrodes. Another embodiment (FIG. 4) requires the use of a 90° optical rotator, for the wavelength of light of interest, between a pair of similarly oriented crystal elements to permit the use of electrodes that are positioned parallel in pairs for the two elements. It must be noted that the crystallographic axes are incorrectly shown in the foregoing FIG. 4. The orientations of the axes illustrated will produce no first-order electrooptic effect from either the $r_{63}$ or the $r_{41}$ electrooptic coefficient. Referring to FIG. 6 of this patent, it is apparent that the crystallographic axes shown in FIG. 4 should be in a position rotated by an angle of 90° about the direction of the light beam, in the same sense for both crystal elements For light that is substantially collimated, it is well known in the art that a halfwave plate chosen for the wavelength of interest may be used in place of the optical rotator in the structure shown in FIG. 4.

The crystallographic axes in the two crystal elements in the structure shown in FIG. 4 may be chosen to permit the application of identical electrical polarities to the parallel pairs of electrodes while having the electrooptically induced retardations additive for polarized light passing through both elements as shown. This may be accomplished, for example, by fabricating either one of the crystal elements in FIG. 4 such that its crystallographic orientation is rotated by an angle of 90° about the Z axis when referred to the corrected orientations of the axes discussed above.

The advantages of mounting the two crystal elements of a matched pair between two supporting electrodes include ease of crystal alignment, simplification of the supporting structure, the option of bringing the elements close together (limited only by the thickness of the interposed element) to minimize space requirements, and the relative ease of accommodating the transfer of heat to maintain the elements at substantially equal temperatures which is required in the birefringence-compensated multi-crystal design.

The elimination of the halfwave plate or optical rotator between the paired crystal elements requires, in present devices, that the elements be oriented so that the applied electric field in each element is perpendicular to the electric field in the other element as shown in FIG. 3 of U.S. Pat. No. 3,402,002. This configuration prevents the use of paired parallel electrodes and also requires that the crystal elements be separated by a significant space to avoid electric shorting or arcing The larger spacing between the elements tends to increase the difficulty of maintaining essentially identical temperatures for the elements through the use of thermal links As lasers have increased in size, with larger beam apertures and greater optical power levels, the construction of multi-crystal birefringence-compensated Pockels modulators has been increasingly constrained and limited by the designs set forth in U.S. Pat. No. 3,402,002 or others similar thereto. For the larger beam apertures required to accommodate the increased optical power levels produced by the larger lasers, the use of rectangular apertures has evolved because of considerations such as heat transfer from the modulating crystals. Provision for the required dissipation of the energy absorbed from the optical beams is simplified by the shorter thermal paths, from the crystal material to the electrodes, made possible by the use of rectangular crystal elements For a rectangular aperture that fills the crystal elements, the structure shown in FIG. 3 of U.S. Pat. No, 3,402,002 permits full electrooptic function of only one of the two paired crystal elements, since, for one of the pair, the distance between the electrodes for that element in FIG. 3 would be made significantly larger than the distance between the electrodes for the other electrooptically functional element. The increase in distance between the electrodes results in a proportional reduction in electric field, for a given applied electric potential, in the element having its electrooptic function compromised. The relative electrooptic response of the assembly is reduced by a factor that approaches 0.5 for this structure compared to the response available if both crystal elements were fully functional electrooptically.

The electrooptic functioning of both crystal elements of the rectangular matched pair may be obtained in current devices by using the configuration illustrated in FIG. 4 of U.S. Pat. No. 3,402,002 for a rectangular aperture, with the longer dimension of the aperture parallel with the electrodes. This approach, however, requires the use of an additional component (an optical rotator or halfwave plate) having an optical aperture as large as that of the electrooptic elements. An optical rotator (typically of the highest quality optical quartz) or a halfwave plate having a large aperture is relatively expensive, and the use of such would add two additional optical surfaces to the operating system. Additional surfaces could cause additional optical reflections and add distortions to the optical wavefronts passing through the system.

Because of the inherent problems associated with the prior art devices, it has become desirable to devise means for energizing a plurality of crystal elements supported between a parallel pair of electrodes without the use of an optical rotator or halfwave plate between the crystal elements.

SUMMARY OF THE INVENTION

The present invention solves problems associated with the prior art devices by providing a compensating group of birefringent electrooptic crystal elements having orientations such that the electrooptic retardations are additive while the static retardation of each of the crystal elements is substantially cancelled by the static retardation of one or more of the other elements when polarized light passes through the crystal elements in a direction substantially perpendicular to particular optical surfaces on the crystal elements. The crystal axes of the elements are oriented obliquely with respect to electrifiable surfaces so that electric fields can be applied to the crystal elements through the use of a parallel pair of electrodes, one electrode contacting a surface on each of the crystal elements and another electrode contacting an oppositely disposed surface on each of the foregoing crystal elements. The foregoing conditions for the orientations of the axes of the crystal elements eliminate the need for an optical rotator or halfwave plate between the elements when parallel electric fields are utilized. The principles comprising the invention may be used beneficially with birefringent electrooptic crystals of many types.

DESCRIPTION OF THE PREFERRED EMBODIMENT

Figure 1:
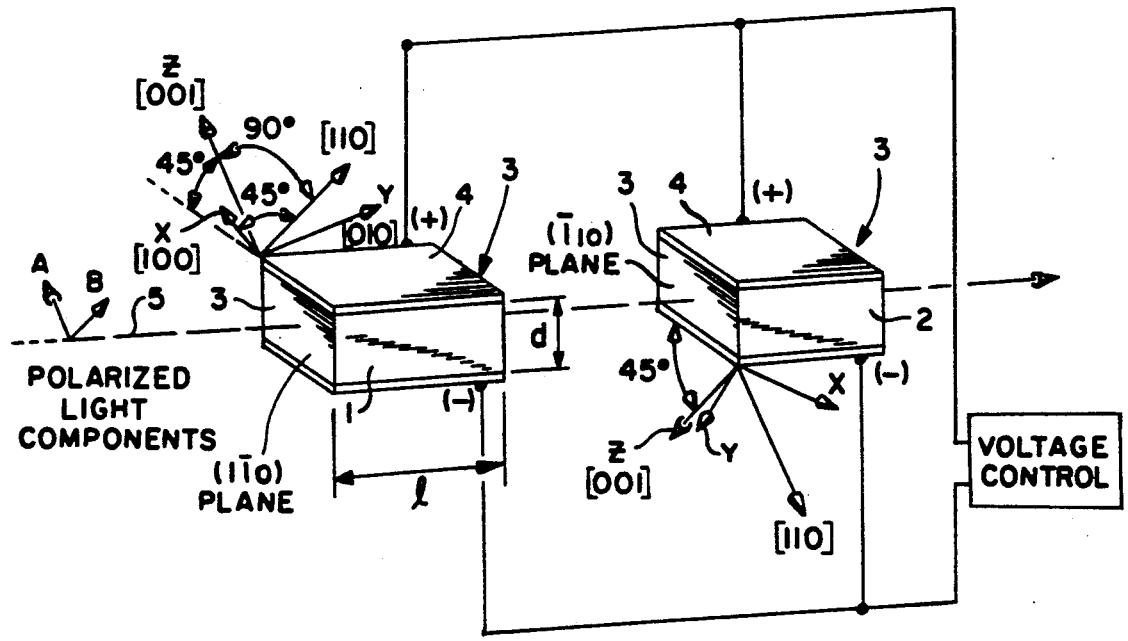
FIG. 1 is a schematic drawing of the present invention.

Referring now to the drawings (where the illustrations are for the purpose of describing the preferred embodiment of the present invention and are not intended to limit the invention described herein), FIG. 1 illustrates a pair of crystals of $KH_2PO_4$, $KD_2PO_4$, or one of their isomorphs cut as parallelepipeds with the optic axes of the paired elements oriented in directions that are oblique to surfaces that are coated with adhering conducting films or the like, or are contacted by electrodes so that said crystals may have uniform electric fields applied thereto.

The use of an electric field applied in a direction that is oblique to the optic axis in a longitudinal-mode electrooptic modulating device has been described by Immarco, et al in U.S. Pat. No. 3,564,450 and by Beasley in U.S. Pat. No. 3,625,592, but no use of this concept is known to have been taught or practiced previously in the design and construction of a transverse-mode device, even though such practice would alleviate several problems encountered in electrooptic devices used with high optical powers.

FIG. 1 illustrates two identically prepared crystals 1 and 2 of $KH_2PO_4$ or $KD_2PO_4$ (the deuterated form), each having the Z axis (designated by Miller indicies as [001]) and the direction designated by Miller indicies [110] both lying in a plane parallel with the optical faces 3 of the crystals 1 and 2. The conventions regarding the use of Miller indicies are described in *Introduction to Solid State Physics* by Charles Kittel, John Wiley & Sons, Inc., 2nd edition, p. 34, (1956). In each crystal, the Z axis ([001]) is oriented at an angle of 45° from the planes of the electroded surfaces 4 of the crystal. As shown in FIG. 1, the orientation of crystal 2 is obtained by orienting the crystallographic axes in this crystal in the same manner as crystal 1 and then rotating this crystal through an angle of 180° about an axis that is parallel with the electroded surfaces 4 and perpendicular to the direction of the light beam 5.

It may be noted that when the electroded surfaces 4 are aligned as shown, the Z ([001]) directions of the two crystals 1 and 2 are perpendicular Since both crystals are of identical length, the static optical retardation experienced by polarized light passing through crystal 1 is compensated by the static optical retardation produced by crystal 2, assuming that the temperatures of the two crystals are substantially identical so that the optical indicies and birefringences are essentially equal.

The beam of polarized light 5 enters the crystals normal to their respective optical faces 3. The electric vectors of the light beam are resolved into components A and B in passing through the crystals with each component experiencing equal physical lengths as a fast ray in one crystal and as a slow ray in the other crystal. With the electric fields set to zero in crystals 1 and 2, the net optical retardation experienced by the light passing through the assembly is zero.

Figure 2:
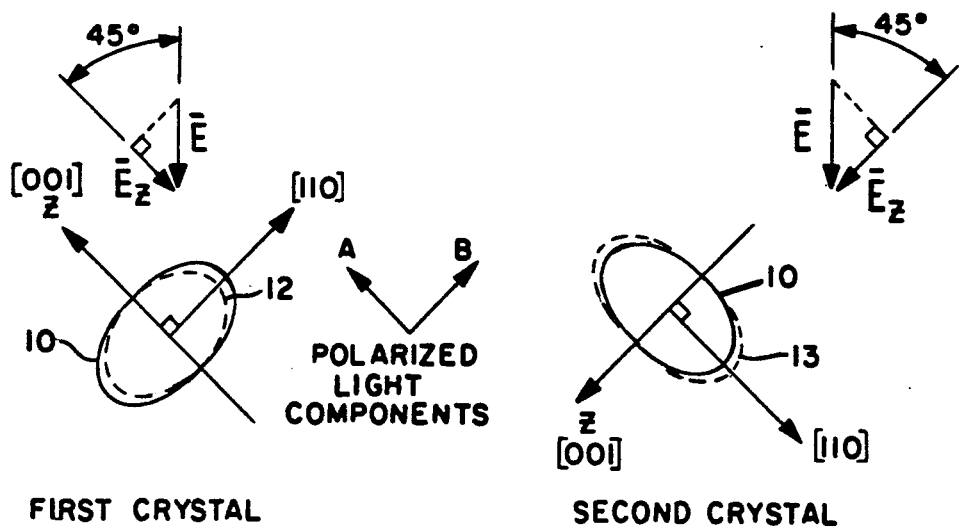
FIG. 2 illustrates the electric fields and the projected sections of the index ellipsoids of the two crystal elements onto a plane perpendicular to the direction of travel of the light beam through the crystals, with the direction of light travel perpendicular to the paper.

Referring now to FIG. 2, the Z ([001]) directions of the two crystals positioned at an angle of 90° from each other are illustrated. The projected section of the index ellipsoid onto a plane perpendicular to the direction of travel of the light beam through each crystal is shown to illustrate the relative magnitudes of the refractive indicies experienced by the polarization components A and B. For the crystal 1, the A component of light travels as an extraordinary ray with an optical index that is not influenced by the applied electric field E. In contrast, the B component of light traveling in crystal 1 travels as an ordinary ray with an optical index that changes with application of the electric field E. In this Figure, it is assumed that the component of the electric field E that is resolved in the negative Z([001]) direction, i.e., $E_z$, causes a reduction in optical index for the ordinary ray as suggested by the smaller dashed ellipse 12.

After passing through crystal 1, component A of the light becomes an ordinary ray upon entering crystal 2 and component B becomes an extraordinary ray. Since a component of the electric field E applied to crystal 2 is resolved along the Z ([001]) direction in the positive sense, the optical index for the ordinary ray in crystal 2 is increased as illustrated by the dashed ellipse 13, rather than decreased, because of the difference in sign of the direction of the component of the electric field E resolved along the Z ([001]) direction in crystal 2 as compared to the sign of the direction of the foregoing component of electric field in crystal 1.

It may be seen that the electrooptically induced changes in retardations in the two crystals are additive in FIG. 2, permitting the use of such a construction of crystals as a transverse-mode paired-crystal electrooptic phase modulator for polarized light. The ability to use two crystals between a single pair of external electrodes with no requirement for an interposed additional element, such as an optical rotator or halfwave plate, is an important improvement over the prior art regarding a paired crystal assembly with cancelled static birefringence in a transverse-mode electrooptic device.

Those persons acquainted with the art will easily discern the possibilities of other combinations of two crystals with different permutations of crystal axis directions that offer the same behavior as that illustrated in FIGS. 1 and 2. For example, one such option is the movement of a crystal oriented as is crystal 1 in FIG. 1 to an orientation that is useful as a complementary crystal by rotating a crystal oriented initially as is crystal 1 through an angle of 90° counterclockwise (looking in the direction of travel of the light beam) about the axis defined by the light beam and then placing electrodes on the surfaces of the rotated crystal that would be parallel with the electroded surfaces of crystal 1.

In all of the possible permutations, the common features are the orientation of the Z ([001]) direction in each crystal at 45° to the parallel electroded surfaces, equal lengths for the paired crystals, a 90° angle between the optic axes of the two bodies, a direction of light passage through the structure at 90° to the directions of the applied electric fields in the two crystals, and a direction of light passage through the structure at right angles to one of the dielectric axes of the index ellipsoid of each of the two bodies.

In achieving the above described structure permitting the use of two crystals operating with parallel electric fields in a transverse-mode electrooptic device, the magnitude of the voltage required for a given cumulative optical retardation is increased by a factor of $\sqrt{2}$ beyond that required for the paired-crystal devices described in U.S. Pat. No. 3,402,002 for a given d/l ratio, where d is the distance through each crystal perpendicular to the parallel electrodes and l is the length of each crystal in the direction of the passage of light. This need for increased applied voltage arises because only a component of the applied electric field (the component resolved at an angle of 45°) is effective in creating a functional electrooptic effect in each of the two crystals with the use of the $r_{63}$ electrooptic coefficient. The component of applied electric field resolved perpendicular to the Z ([001]) direction (in any one of the <110> set of directions, depending upon the crystal orientation chosen) causes no substantial effect upon the optical indicies in crystals of point group $\bar{4}2m$ typified by $KH_2PO_4$ and $KD_2PO_4$.

In the case of the paired-crystal transverse-mode modulators illustrated in FIGS. 3 and 4 of U.S. Pat. No. 3,402,002, the voltage required for a halfwave of optical retardation at a particular wavelength of light is $$\frac{V_\lambda}{2} = (d/l) V_o \quad (1)$$

in which $V_o$ represents the halfwave voltage required for a longitudinal-mode device similar to the device illustrated in FIG. 1 of U.S. Pat. No. 3,402,002 with perfectly conducting transparent electrodes. It may be noted that for a paired-crystal transverse-mode assembly made of two matched cubes, d=1 so that the halfwave voltage is the same as for a single cube operating as a longitudinal assembly having perfectly conducting transparent electrodes. The electrooptically induced birefringence in each of the matched cubes is half as strong as that induced in the longitudinally operated cube (similar to FIG. 1 of U.S. Pat. No. 3,402,002) with perfectly transparent electrodes, but the two matched cubes provide an optical path to accumulate retardation that is twice as long as the path in a single cube of the same edge dimensions.

For the new configuration having the Z ([001]) directions oriented obliquely with respect to the applied electric fields, the expression for the halfwave voltage may be similarly written as $$\frac{V_\lambda}{2} = \sqrt{2} \; (d/l) V_o \quad (2)$$

The price of added flexibility in the design of heat conductive paths and of provisions for relative ease of crystal alignment is a voltage requirement that is 41% higher than that required for dual crystal modulators having crossed electric fields or requiring additional optical elements, for a given ratio of d/l . The use of crystals of other useful point groups may result in voltage penalty factors different from $\sqrt{2}$, depending upon the aggregate effects of the functional electrooptic coefficients. Since large crystals of the $KH_2PO_4$ type are available, actual operating voltages may be adjusted easily by using crystal bodies of this material having lengths extended enough to reduce the voltage requirements to a satisfactory level in electrooptic devices using the principles of the invention.

The invention should be useful with other types of birefringent crystals in addition to those of point group $\bar{4}2m$. Any birefringent, electrooptic crystal material having a relatively large electrooptic coefficient $r_{13}$, $r_{33}$ or $r_{63}$ in uniaxial material, or having a relatively large electrooptic coefficient such as $r_{11}$, $r_{22}$, $r_{33}$, $r_{13}$, $r_{23}$, or the like, in biaxial material such as $Ba_2 Na Nb_5 O_{15}$ useful in the transverse-mode with light traveling in a direction perpendicular to two of the three dielectric axes of the index ellipsoid, could be considered for use with the principles of the invention in a transverse-mode, multi-element electrooptic modulator with the crystal elements having axes obliquely oriented with respect to the direction of the electric field applied as a controlling means. $Sr_{0.75} Ba_{0.25} Nb_2O_6$ (tetragonal, 4 mm) has, for instance, an $r_{33}$ coefficient ($1340 \times 10^{-12}$ m/v) that is much larger than its other electrooptic coefficients, so it should be a good candidate to consider for use in the invention if it is available in good optical quality.

The common characteristics among the configurations used in the application of the principles of the invention are the passage of the light to be modulated through the birefringent crystal material in a direction substantially perpendicular to at least one dielectric axis of the index ellipsoid, the use of multiple crystal bodies with their fast polarization eigenvectors arranged at an angle substantially 90° to each other in order to achieve substantial cancellation of the static retardation resulting from the static birefringence, the orientation of crystal axes oblique to the applied electric fields used to produce an electrooptic effect in the crystal material, the arrangement of the crystal bodies so that the electrooptically induced retardations in the crystal bodies are additive in the assembly, the use of parallel electroded surfaces in the assembly so that the electric fields applied in the assembly are parallel, and the lack of a need for the introduction of an optical rotator or waveplate to achieve cancellation of the effects of static birefringence.

It is remarkable that the addition of such an apparently subtle and heretofore unused concept to the existing art in multi-crystal devices should be able to produce such useful and unexpected benefits in opening new options for designs of Pockels devices that will be useful in areas of growing need in laser related technologies.

Although the invention has been described with reference to preferred embodiments, including particular applications thereof, certain modifications and substitutions that do not depart from the true scope of the invention will become readily apparent to those skilled in the art. It is intended that the scope of the invention be limited only as defined in the following claims.

I claim:

1. A transverse-mode electrooptic modulator comprising a plurality of bodies formed from birefringent electrooptic crystal material, each of said bodies having first and second oppositely disposed electrifiable surfaces that form an oblique angle with each of the crystallographic axes of each of said bodies.

2. A transverse-mode electrooptic modulator comprising a plurality of bodies formed from birefringent electrooptic crystal material, each of said bodies having first and second oppositely disposed electrifiable surfaces that form an oblique angle with at least two dielectric axes of the index ellipsoid of each of said bodies.

3. The electrooptic modulator as defined in claim 1 wherein said first and second oppositely disposed electrifiable surfaces form an oblique angle with at least one dielectric axis of the index ellipsoid of each of said bodies.

4. The electrooptic modulator as defined in claim 1 wherein the application of an electric potential between said first and second electrifiable surfaces on said plurality of bodies causes an electrooptically induced change in the optical retardation in each of said plurality of bodies.

5. The electrooptic modulator as defined in claim 4 wherein said electrooptically induced change in the optical retardation in each of said plurality of bodies is additive for said plurality of bodies.

6. The electrooptic modulator as defined in claim 1 wherein the fast polarization eigenvector of one of said bodies within said group of bodies is substantially perpendicular to the fast polarization eigenvector of another of said bodies within said group of bodies.

7. The electrooptic modulator as defined in claim 6 wherein said bodies are grouped and positioned such that the static optical retardation of one of said bodies is substantially cancelled by the static optical retardation of at least one of the other of said bodies within said group of bodies.

8. The electrooptic modulator as defined in claim 1 wherein the light to be modulated passes through said crystal material substantially perpendicular to at least one dielectric axis of the index ellipsoid in a direction of finite birefringence.

9. The electrooptic modulator as defined in claim 8 wherein the passage of light to be modulated through said modulator is in a direction substantially perpendicular to said dielectric axis of the index ellipsoid in each of said bodies within said plurality of bodies.

10. The electrooptic modulator as defined in claim 1 further including mans to maintain said plurality of bodies at substantially the same temperature.

11. The electrooptic modulator as defined in claim 1 wherein each of said plurality of bodies includes first and second oppositely disposed optical surfaces oriented substantially perpendicular to said first and second electrifiable surfaces and substantially perpendicular to the direction of passage of light to be modulated.

12. The electrooptic modulator as defined in claim 1 wherein each of said plurality of bodies has a dielectric axis of the index ellipsoid positioned at an angle of about 45° relative to said first and second oppositely disposed electrifiable surfaces.

13. The electrooptic modulator as defined in claim 1 wherein said first electrifiable surfaces of said plurality of bodies are substantially coplanar and said second electrifiable surfaces of said bodies are substantially coplanar.

14. The electrooptic modulator as defined in claim 1 further including first and second oppositely disposed conducting plates, each of said first and second oppositely disposed conducting plates operatively contacting one of said electrifiable surfaces on each of said bodies.

15. The electrooptic modulator as defined in claim 1 wherein at least one of said first and second electrifiable surfaces on each of said bodies has an adhering conducting film provided thereon.

16. The electrooptic modulator as defined in claim 1 wherein said plurality of bodies is formed from crystal material of crystallographic point group $\overline{4}2$ m.

17. The electrooptic modulator as defined in claim 16 wherein the $r_{63}$ electrooptic coefficient of said crystal material determines the useful electrooptic function of said modulator.

18. The electrooptic modulator as defined in claim 16 wherein each of said plurality of bodies has crystallographic directions designated by Miller indicies as [001] and directions of type <110> located in a plane substantially perpendicular to said first and second oppositely disposed electrifiable surfaces and substantially perpendicular to the direction of travel of light that is to be modulated through said plurality of bodies.

19. The electrooptic modulator as defined in claim 18 wherein said crystallographic direction designated by Miller indicies as [001] is positioned at an angle of about 45° relative to said first and second oppositely disposed electrifiable surfaces.

* * * * *